United States Patent [19]

Thompson et al.

[11] Patent Number: 5,061,084

[45] Date of Patent: Oct. 29, 1991

[54] PYROMETER APPARATUS AND METHOD

[75] Inventors: Thomas E. Thompson, Los Altos; Eugene R. Westerberg, Palo Alto, both of Calif.

[73] Assignee: AG Processing Technologies, Inc., Sunnyvale, Calif.

[21] Appl. No.: 652,459

[22] Filed: Feb. 7, 1991

Related U.S. Application Data

[63] Continuation of Ser. No. 186,556, Apr. 27, 1988, abandoned.

[51] Int. Cl.$^5$ ............................................. G01J 5/06
[52] U.S. Cl. .................................. 374/127; 374/128; 374/133; 356/45
[58] Field of Search ............... 374/123, 126, 127, 128, 374/133; 356/45; 219/390

[56] References Cited

U.S. PATENT DOCUMENTS

| | | | |
|---|---|---|---|
| 3,448,283 | 6/1969 | Higley et al. | 374/133 |
| 3,735,136 | 5/1973 | Flint | 374/123 |
| 3,759,102 | 9/1973 | Murray | 374/123 |
| 4,144,758 | 3/1979 | Roney | 374/126 |
| 4,222,663 | 9/1980 | Gebhart et al. | 356/45 |
| 4,227,369 | 10/1980 | Williams | 374/123 |
| 4,432,657 | 2/1984 | Rudzki et al. | 374/126 |
| 4,553,820 | 8/1985 | Shimizu | 219/390 |
| 4,579,461 | 4/1986 | Rudolph | 374/126 |
| 4,722,612 | 2/1988 | Junkert et al. | 374/133 |
| 4,764,025 | 8/1988 | Jensen | 374/127 |
| 4,919,542 | 4/1991 | Nulman et al. | |

FOREIGN PATENT DOCUMENTS

| | | | |
|---|---|---|---|
| 242044 | 10/1962 | Australia | 374/127 |
| 2339732 | 2/1975 | Fed. Rep. of Germany | 374/126 |
| 0160029 | 10/1982 | Japan | 374/129 |
| 60-253939 | 4/1985 | Japan. | |
| 0131430 | 7/1985 | Japan | 374/121 |
| 0130834 | 6/1986 | Japan | 374/133 |
| 0050627 | 3/1987 | Japan | 374/121 |
| 0763698 | 9/1980 | U.S.S.R. | 374/126 |
| 1212685 | 11/1970 | United Kingdom | 374/121 |
| 2045425 | 10/1980 | United Kingdom | 374/126 |
| 2082767 | 3/1982 | United Kingdom | 374/128 |

*Primary Examiner*—Thomas B. Will
*Attorney, Agent, or Firm*—A. C. Smith

[57] ABSTRACT

Dual pyrometric detectors and method measure the temperature of a remote heated object in the presence of ambient radiation. One detector measures emitted radiation from both the remote object and from the environment, and the other direction measures radiation predominantly from the environment alone. The output signals from the two detectors are processed electronically to yield the detected radiation from the remote object alone. The result can then be electronically processed to display the pyrometrically-measured temperature of the remote object.

9 Claims, 5 Drawing Sheets

TYPICAL SPECTRAL ENERGY FLUXES INCIDENT ON PYROMETER 10 BELOW THE WINDOW, FROM LAMP FILAMENTS, A 900°C SI WAFER, AND QUARTZ TUBE AT 400°C.
UNITS: WATTS/$\mu$m/cm$^2$/STERADIAN.

SPECTRAL RADIANCE AT 4.5μm FROM SILICON AND QUARTZ

UNITS: WATTS/μm/cm$^2$/STERADIAN

RADIATION FLUXES INCIDENT ON WAFER PYROMETER FROM
(1) SILICON WAFER
(2) QUARTZ ISOLATION TUBE
(3) QUARTZ WINDOW

PYROMETER APPARATUS AND METHOD

RELATED APPLICATION

This is a continuation of co-pending application Ser. No. 07/186,556 filed on Apr. 27, 1988 now abandoned.

The subject matter of this application is related to the subject matter of application Ser. No. 114,542, "Emissivity Calibration Apparatus and Method", filed on Oct. 26, 1987, by Michel Pecot and Jaim Nulma now U.S. Pat. No. 4,854,727.

BACKGROUND OF INVENTION

Radiation thermometry is a technique which allows the measurement of the temperature of a remote object by analyzing the radiation emitted by the object. All objects at temperatures greater than 0 kelvin emit radiation which can be measured to determine the temperature of the object. The concept of radiation thermometry is based upon the underlying principles that as an object which has a certain emissivity heats up, it emits radiation that shifts in wavelength and increases in intensity such that an object which radiates with an orange glow is hotter than an otherwise identical object which radiates with a red glow. Details of radiation thermometry are discussed in the literature (See, for example, Tenney; *Mechanical Engineering*, Oct. '86; "Red Hot . . . AND HOTTER", pp. 36-41.)

In the case of an object inside a furnace or other environment of elevated ambient temperature, it is not easy to optically detect the radiation from the object alone. Radiation from hot elements present in the environment will be reflected to some degree by the object being detected. Thus, where the object is reflecting significant amounts of unabsorbed radiation, simple optical detection apparatus will indicate a temperature which is higher than the true temperature of the object alone.

SUMMARY OF INVENTION

In accordance with the present invention, dual pyrometer detectors and method measure the temperature of a remote heated object such as semiconductor wafer in the presence of ambient radiation within a processing chamber. More specifically, the present invention uses a contactless method to accurately determines the temperature of a remote object within the surrounding environment which includes ambient radiation from a heating source and a hot quartz isolation tube that surrounds the remote object. For example, when quickly heating an object in a furnace, the true temperature of the object may be substantially lower than the surrounding temperature inside the furnace. This problem is further complicated when a hot quartz isolation barrier is positioned around the object, and is further complicated when the temperature of the object is below 700° C.

In accordance with the illustrated embodiment of the present invention, one detector measures emitted radiation from both the remote object and from the environment, and the other detector measures radiation substantially only from the environment. The appropriate difference between the outputs of these two detectors yields the detected radiation from the remote object alone and thus final signal can then be used to determine the temperature of the remote object.

DESCRIPTION OF PREFERRED EMBODIMENT

Figure 1:
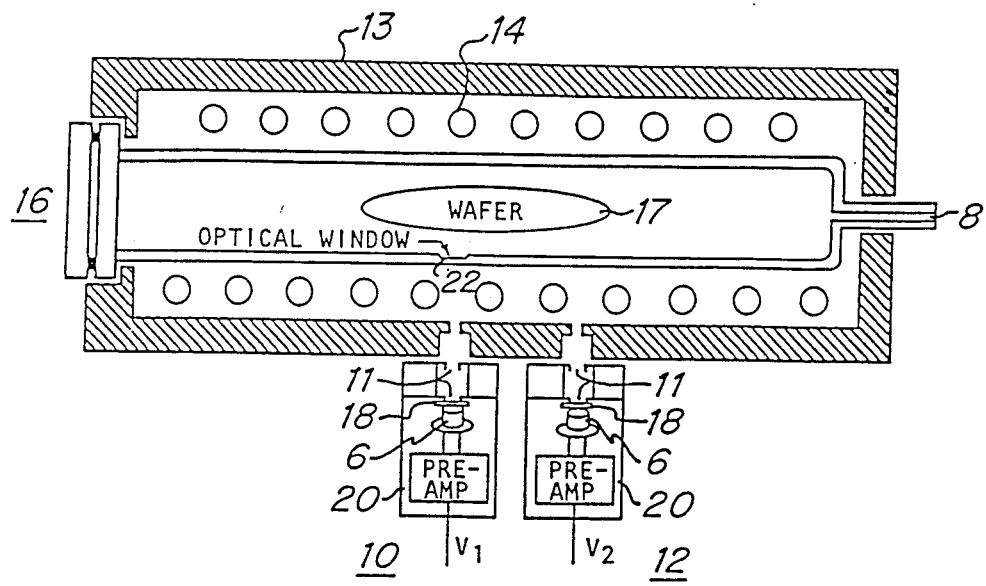
FIG. 1 is a pictorial section view of one implementation of the preferred embodiment of the invention.

Referring now to FIG. 1, the illustrated preferred embodiment of the present invention includes two pyrometer assemblies 10 and 12 positioned near the furnace chamber 13. The furnace chamber 13 is gold-plated internally to reflect the radiation of the tungsten-halogen lamps 14 which are arranged as the heating elements for the semiconductor wafer 17. The wafer 17 is isolated from the atmospheric environment by an isolation tube 15, which may be formed in whole or in part from radiation-transmissive materials such as quartz or sapphire.

Typically, the isolation tube 15 is formed of quartz about 3 mm thick. The wafer 17 is supported within the isolation tube 15 by pins (not shown) that may also be formed of such radiation-transmissive materials. The lamps 14 are positioned between the interior of the furnace chamber 13 and the isolation tube 15. At one end of the isolation tube 15 is a sealable hatch 16 which can be opened to remove or insert a wafer 17 or other object into the isolation tube 15, and appropriate inert or reactive gases may be introduced into the isolation tube 15 through port 8 during processing of the wafer 17.

The pyrometer assemblies 10 and 12 include infrared detectors 6, optical-path slits 11 positioned to geometrically limit the radiation that strikes the detector 6, and radiation pass-band-filters 18 that limit the band of infrared radiation that strikes the detectors. These detectors 6 may include thermopiles, each including a plurality of thermo couples, that respond to the incident radiation to produce representative electrical signals in known manner. The detectors 6 are thus disposed to respond to radiation within the band and within the immediate field of view or "view area" through the apertures or slits 11 in the housing 20.

One of the pyrometer assemblies 10 is positioned to sense radiation that passes through the optical window 22 in the isolation tube 15. Typically, this window is made of quartz of about 0.15 mm thickness. The second pyrometer assembly 12 is positioned to sense radiation from the isolation tube 15 at a different location with no optical window in its field of view.

Figure 3:
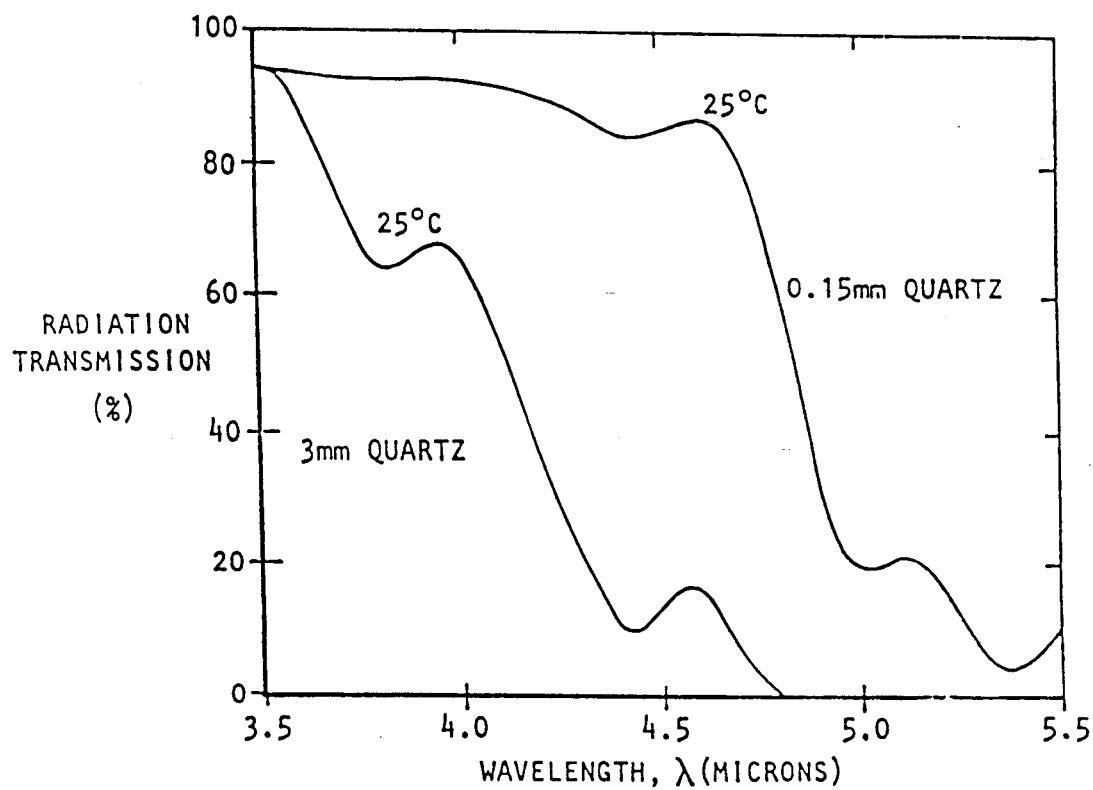
FIG. 3 is a graph illustrating the transmission characteristics of quartz at two different thicknesses as a function of the radiation wavelength.

One of the principles of the present invention may be understood from an analysis of the transmission characteristics of the isolation tube material which allow differentiation between the radiation signals incident upon the two pyrometer assemblies 10 and 12. Typical transmission characteristics of the isolation tube and optical window 22 are illustrated in the graph of FIG. 3 for the isolation tube made of 3 mm quartz and the window made of 0.15 mm quartz. It can be seen that 3 mm quartz effectively attenuates radiation having wavelengths greater than 4.3 microns, whereas 0.15 mm quartz (in the optical window 22) has an equivalent attenuation only for wavelengths greater than 4.9 microns. For sapphire windows, the transmissivity as a function of wavelength of the transmitted radiation over substantially the same temperature range remains higher than for quartz out to longer wavelengths (not shown). By choosing band pass filters 18 that pass radiation between 4.3 and 4.7 microns, the first pyrometer assembly 10 senses radiation from the hot wafer that passes through the optical window 22 as well as radiation from the chamber environment, including the lamps 14 and the hot quartz of the isolation tube 15. The second pyrometer assembly 12 located in alignment with the hot wafer thus senses mainly radiation from the chamber environment, including the lamps 14 and the hot quartz of the isolation tube 15.

Figure 4:
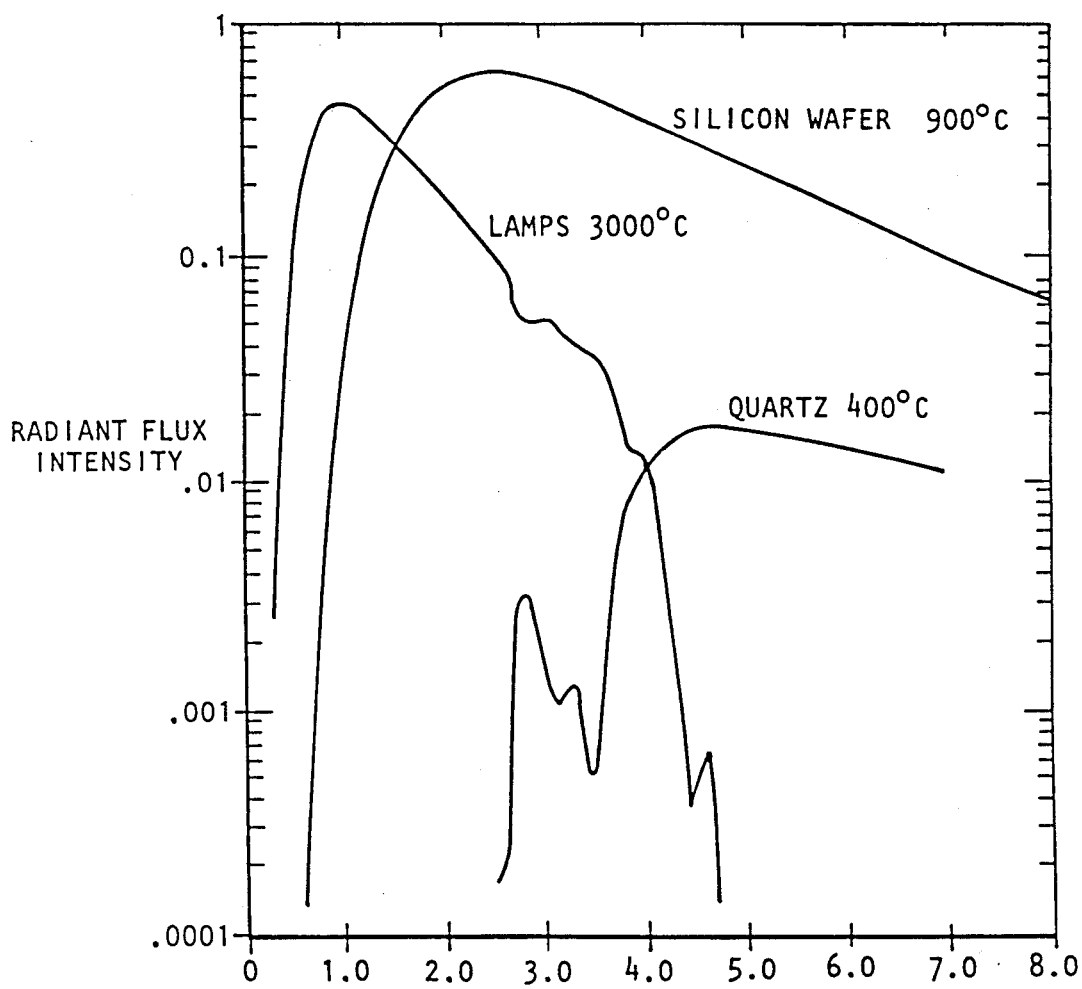
FIG. 4 is a graph illustrating representative radiation intensities from three different emitting elements in an implementation of the preferred embodiment, namely, the tungsten-halogen lamps, a silicon wafer, and the quartz chamber.

FIG. 4 illustrates typical spectral energy fluxes that are incident on the pyrometer assembly 10 below the window 22 from the three main sources of radiation. In this illustrated embodiment of the present invention, those main sources of radiation include the tungsten filaments of the tungsten-halogen lamps 14 at about 3000° C., the silicon wafer 17 at about 900° C., and the quartz isolation tube 15 at about 400° C. It should be noted that the quartz does not radiate significantly until it becomes opaque (above about 3.5 microns), and that the quartz radiation does not come solely from the window area. It should also be noted that when the quartz isolation tube 15 becomes opaque, a considerable amount of the lamp radiation is blocked by the quartz of the isolation tube 15.

Referring again to FIG. 3, quartz is shown as transmitting radiation at wavelengths less than 4.0 microns through two different thicknesses, namely, 0.15 millimeters and 3.0 millimeters. Since the tungsten-halogen lamps 14 radiate predominantly at an approximate wavelength of about 1.0 microns at the operating temperature of about 3000° C., the quartz of the isolation tube 15 readily transmits the radiant energy from the lamps to the wafer 17 which then heats up.

As indicated in FIG. 4, the radiated lamp energy that arrives at the pyrometer assemblies is predominantly at wavelengths less than about 4.0 microns. Thus, the filters 18 associated with the pyrometer assemblies 10 and 12 essentially eliminate responsiveness of the detectors 6 to radiation from the lamps 14 and enhance the responsiveness thereof to radiation from the silicon wafer at the various temperatures thereof.

The combination of 4.3 to 4.7 micron band-pass filters 18 and the window 22 in the quartz isolation tube 15 enables the two pyrometer assemblies 10 and 12 to respond to radiation from distinctive, composite sources, i.e. to the radiation from the chamber environment alone and to the radiation from the chamber environment and wafer combined. Therefore, the radiation emitted by the wafer 17 alone can now be isolated to provide an accurate indication of its true temperature within the hot chamber environment.

Figure 5:
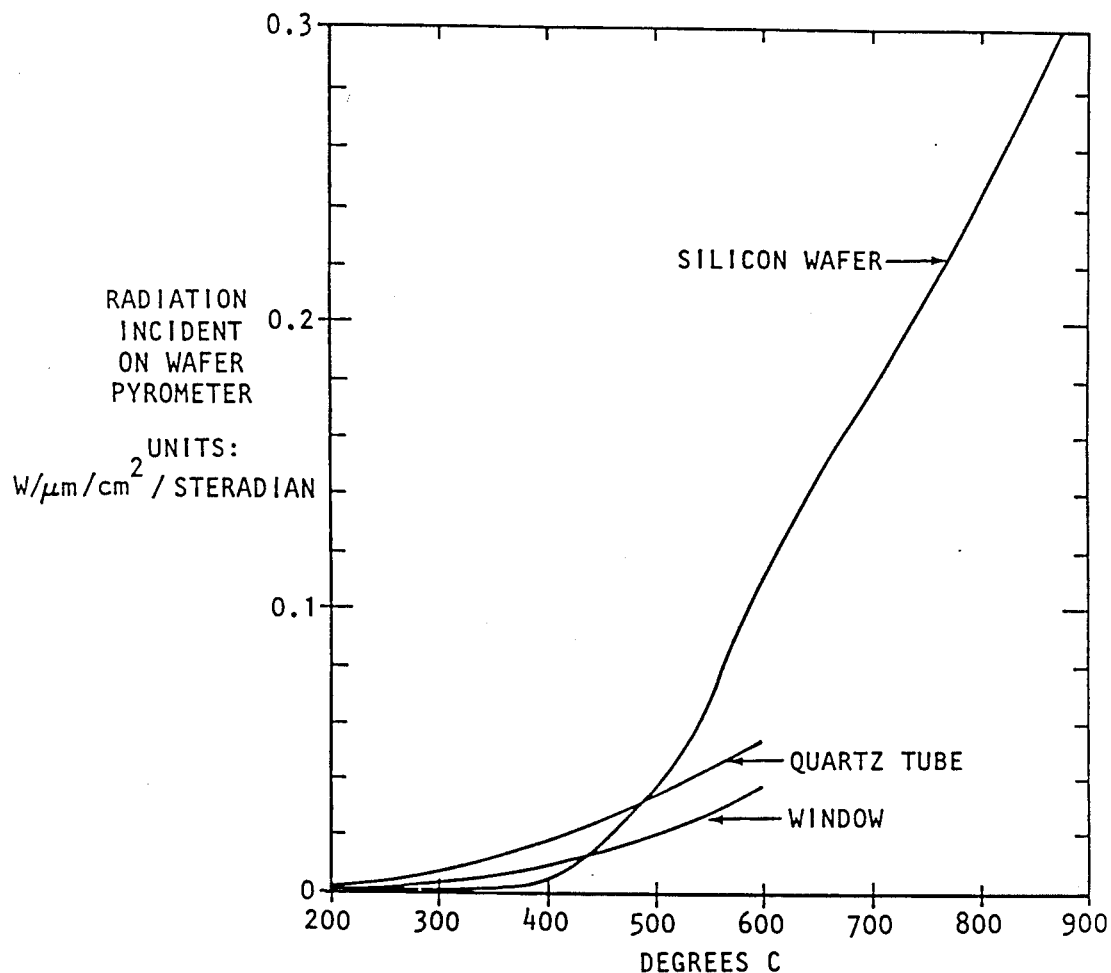
FIG. 5 is a graph illustrating the radiant energy incident upon a pyrometer assembly at about 4.5 microns wavelength as a function of the temperature of radiating elements.

FIG. 5 indicates the temperature dependence of the radiation fluxes on the pyrometer assembly 10 from three main sources of radiation in the 4.3 to 4.7 micron wave band in one embodiment of the invention.

Figure 2:
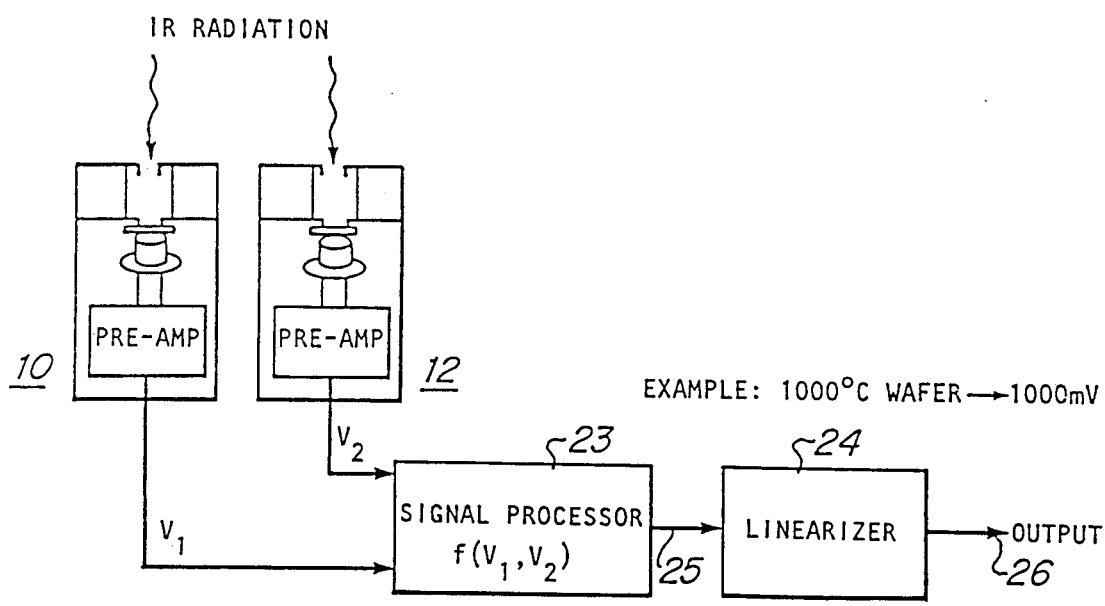
FIG. 2 is a pictorial schematic diagram of the operating circuitry of the present invention.

Referring now to FIG. 2, the output signals generated by the pyrometer assemblies 10 and 12 are applied to electronic signal processing circuitry that produces an output voltage which is a true indication of the temperature of the object. In the present embodiment, this signal processing circuitry includes a differential amplifier 23 the output of which is applied to a linearizer circuit 24. The signal processor 23 may include a differential amplifier which subtracts a selected multiple, A, of the voltage $V_2$, generated by pyrometer assembly 12 from the voltage $V_1$ generated by pyrometer assembly 10, to provide a voltage 25 indicative of the true temperature of the wafer 17 alone. The linearizer circuit 24 includes conventional circuitry which produces an output signal 26 that is linearly proportional to the true wafer temperature.

Figure 6:
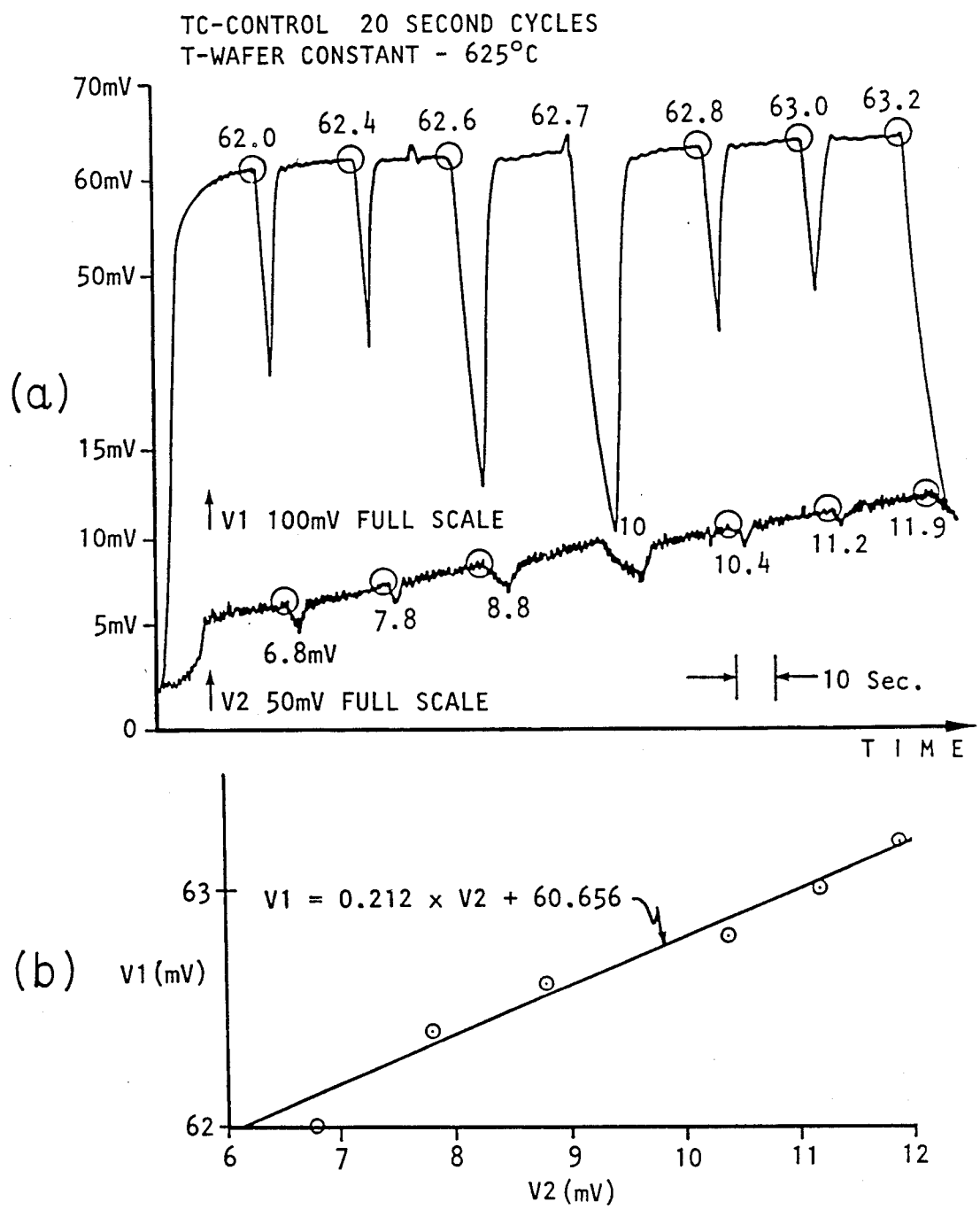
FIGS. 6(*a*) and (*b*) are graphs of output signal levels from the two detectors of the present invention.

The multiple, A, may be determined experimentally, for example as illustrated in the graphs of FIG. 6(a) and (b), from the functional correlation of the incremental variation of $V_1$ from pyrometer assembly 10 with $v_2$ from the pyrometer assembly 12 as the isolation tube 15 and wafer 17 are heated up in successive heating cycles over time. In addition, the emissivity of the wafer 17 may vary with the diverse surface coatings on the wafer. Thus, the multiple, A, depends upon the surface characteristics of the particular wafer 17 and upon the temperatures of the wafer 17 and isolation tube 15 through which the heating process takes place. The multiple, A, may thus be determined by characterizing the portion or percentage variations in the signal $V_1$, attributable to variations in the signal $V_2$, as illustrated in FIG. 6(b):

$$V_1 = A \cdot V_2 + B$$

In one embodiment of the invention for a sample wafer 17 of given surface properties operating at about 625° C. (as measured accurately by contact thermometry apparatus of conventional design, A is determined to be approximately 21%. The signal processor 23 thus Produces an output signal 25 representative of the temperature of the wafer 17 with a certain radiation emissivity. The correlation between this output signal (optically determined) and the true wafer temperature may thus be determined in accordance with one embodiment using a sample wafer 17 mounted in close thermal contact with a thermally-responsive element such as a thermocouple that is calibrated in actual temperature. One such correlation technique is described, for example, in the aforementioned Related Application. The correlation between actual wafer temperature and the optically measured temperature of the wafer 17 can then be used for thereafter optically measuring the temperature of the rest of a population of wafers having identical surface characteristics in a given batch of wafers as each is inserted into the isolation tube 15. The linearizer 24 may include a conventional analog shaping circuit (or a digitizer and lookup table of values determined by such preliminary calibration procedures) to convert voltages at the inputs of the signal processor 23 into corresponding, direct temperature outputs 26 or readings. Such linearization may be employed to overcome the non-linear levels of radiation from the wafer as a function of temperature, for example, as shown in FIG. 5.

Therefore, the apparatus and method of the present invention for optically measuring the temperature of a remote object within a hot environment operates within selected wavebands on substantially the ambient radiation alone and on the composite ambient radiation and radiation from the remote object to provide a direct indication of the temperature of the remote object. Changes in emissivity of the remote object may be taken into account by correlating the radiant temperature reading of a sample object with true, contact temperature readings of the object, and the true temperature of all identical objects in a batch may thereafter be optically measured accurately.

What is claimed is:

1. A method for sensing the temperature of a remote object within a chamber that is heated by a source of radiation within a selected waveband that is outside the chamber where the chamber has a boundary wall that is formed of a material which is substantially transparent to radiation within said selected waveband and that is heated by radiation within said selected waveband from said source, the method comprising the steps of:

detecting within a first waveband that is substantially separated from the selected waveband the composite radiation received from the remote object through the material of the boundary wall and from the boundary wall to provide a first indication;

substantially simultaneously detecting within a second waveband, that is substantially separated from the selected waveband, the radiation emitted from the boundary wall alone to provide a second indication; and processing the first and second indications to provide an output indication of the temperature of the remote object substantially independent of the radiation from the boundary wall.

2. A method for sensing the temperature of a remote object within a chamber having a boundary wall which is formed from a material that is substantially transparent to radiation within a selected waveband, the method comprising the steps of:

detecting the composite radiation occurring within a first waveband from the remote object through a window formed from the material of the boundary wall and from the boundary wall to provide a first indication;

detecting the radiation emitted within a second waveband that is substantially separated from the selected waveband substantially from a region of the boundary wall alone to provide a second indication;

the material in the window of the boundary wall through which radiation form the remote object is detected is thinner than the material of the boundary wall to provide radiation transmissive characteristics through the window that are different from the radiation transmission characteristics of the material in the region of the boundary wall from which the radiation for the second indication is detected; and processing the first and second indications to provide an output indication of the temperature of the remote object substantially independent of the radiation from the boundary wall.

3. A method for sensing the temperature of a remote object within a chamber having a boundary wall including quartz that is substantially transparent to radiation within a selected waveband, the method comprising the steps of:

detecting the composite radiation occurring within a first waveband from the remote object through the boundary wall and from the boundary wall to provide a first indication by measuring radiation from the remote object through a thickness of said quartz in a window region of the boundary wall that is substantially thinner than said quartz in the remainder of the boundary wall from which the boundary-wall radiation is detected;

detecting the radiation emitted substantially from the remainder of the boundary wall alone within a second waveband that is substantially separated from the selected waveband to provide a second indication; and processing the first and second indications to provide an output indication of the temperature of the remote object substantially independent of the radiation from the boundary wall.

4. The method according to claim 3 wherein in the steps of detecting, the composite radiation and the boundary-wall radiation are measured substantially within the first and second waveband between approximately 4.3 microns and 4.7 microns.

5. Apparatus for measuring the elevated temperature of a remote object within a heated chamber having a boundary wall of a material that transmits radiation within a selected waveband, the apparatus comprising:

radiation detection means including a pair of radiation detectors disposed external to said chamber, one of said pair of detectors being responsive to radiation within a field of view;

a window of radiation transmissive material in the boundary wall which is oriented within said field of view of said one of said radiation detectors and which has greater transmissivity of radiation within a first waveband which is substantially separated from the selected waveband than the transmissivity of the boundary wall to radiation within said first waveband;

said one of the pair of detectors being responsive to radiation that emanates from the object and from the boundary wall within said field of view through the window and that is within said first waveband for generating an output signal, and the other of said pair of detectors having a field of view and being responsive to radiation that emanates from the boundary wall within its field of view and that is within said first waveband for generating an output signal;

heating means disposed about said chamber and positioned substantially out of the field of view of each of said pair of radiation detectors for radiantly heating with radiation within the selected waveband the remote object within the chamber through said boundary wall; and circuit means coupled to receive the output signals from said detection means for producing therefrom an output that is representative of the elevated temperature of the remote object within the chamber substantially independent of radiation from the boundary wall.

6. Apparatus as in claim 5 wherein said radiation detectors comprise:

housing means disposed thereabout and including an aperture positioned in a side of the housing means for limiting the field of view of each radiation detector substantially to alignment with the remote object within the chamber, with the field of view of only said one of said pair of radiation detectors being aligned with said window.

7. Apparatus as in claim 5 wherein said boundary wall is formed from quartz and comprising:
   filter means disposed within the fields of view of the radiation detectors for transmitting therethrough substantially only radiation within the waveband from approximately 4.3 microns to approximately 4.7 microns.

8. A method for sensing the temperature of a remote object within a chamber having a boundary wall that is substantially transparent to radiation within a selected waveband and that includes a radiation transmissive window, the method comprising the steps of:
   detecting through the radiation transmissive window the composite radiation occurring within a first waveband from the remote object through the window of the boundary wall and from the boundary wall to provide a first indication;
   detecting the radiation emitted within a second waveband that is substantially separated from the selected waveband substantially from a region of the boundary wall alone that is separated from the window to provide a second indication;
   the radiation transmissive window in the boundary wall through which radiation from the remote object is detected has radiation transmissive characteristics that are different from the radiation transmission characteristics of the region of the boundary wall from which the boundary wall radiation is detected; and
   processing the first and second indications to provide an output indication of the temperature of the remote object substantially independent of the radiation from the boundary wall.

9. The method according to claim 8 in which the boundary wall includes quartz and the radiation transmissive window includes sapphire, and wherein in the step of detecting composite radiation includes measuring the radiation from the remote object through the window and wherein the step of detecting the boundary-wall radiation includes measuring radiation from the quartz at the location separated from the window.

* * * * *